US008678629B2

(12) United States Patent
Ishida et al.

(10) Patent No.: US 8,678,629 B2

(45) Date of Patent: Mar. 25, 2014

(54) LAMP UNIT FOR VEHICULAR HEADLAMP

(75) Inventors: Hiroyuki Ishida, Shizuoka (JP); Takuya Kotajima, Shizuoka (JP); Hidetada Tanaka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/852,686

(22) Filed: Aug. 9, 2010

(65) Prior Publication Data

US 2011/0032722 A1 Feb. 10, 2011

(30) Foreign Application Priority Data

Aug. 10, 2009 (JP) ................................ 2009-185625

(51) Int. Cl.

*B60Q 1/00* (2006.01)
*G01D 21/00* (2006.01)
*B60Q 1/12* (2006.01)
*F21V 7/00* (2006.01)
*F21V 7/08* (2006.01)

(52) U.S. Cl.

USPC ........ 362/538; 362/460; 362/53; 362/296.01; 362/296.06

(58) Field of Classification Search

USPC .................. 362/53, 296.06, 296.01, 460, 538
See application file for complete search history.

(56) References Cited

U.S. PATENT DOCUMENTS 7,156,544 B2 * 1/2007 Ishida ........................... 362/538
7,311,430 B2 12/2007 Tsukamoto et al.
7,387,416 B2 * 6/2008 Tsukamoto et al. .......... 362/518
2005/0068787 A1 * 3/2005 Ishida ........................... 362/538
2005/0122735 A1 * 6/2005 Watanabe et al. ............. 362/539
2006/0171160 A1 * 8/2006 Meyrenaud et al. .......... 362/517
2006/0215415 A1 * 9/2006 Suzuki et al. ................. 362/539
2007/0086202 A1 4/2007 Tsukamoto et al.
2007/0236953 A1 * 10/2007 Nakazawa et al. ............ 362/544
2008/0253141 A1 * 10/2008 Nakada et al. ................ 362/507
2009/0097268 A1 * 4/2009 Mochizuki .................... 362/538

(Continued)

FOREIGN PATENT DOCUMENTS

JP 2007-80606 A 3/2007
JP 2007-109493 A 4/2007
JP 2008-288113 A 11/2008

OTHER PUBLICATIONS

Japanese Office Action issued on Jul. 23, 2013 in Japanese Patent Application No. JP 2009-185625.

*Primary Examiner* — Jong-Suk (James) Lee
*Assistant Examiner* — Bryon T Gyllstrom
(74) *Attorney, Agent, or Firm* — Sughrue Mion, PLLC

(57) ABSTRACT

A lamp unit for a vehicular headlamp includes: a projection lens arranged to have an optical axis extending in a vehicle longitudinal direction; a light-emitting element that is a light source arranged on a rear side with respect to a rear focal point of the projection lens; and a reflector that is formed so that a longitudinal section of the reflector has the shape of an ellipse having a first focal point at a center of light emission of the light-emitting element and a second focal point at the rear focal point of the projection lens, wherein the reflector is arranged to cover the light-emitting element and reflects irradiated light toward the projection lens, the irradiated light being light irradiated from the light-emitting element. A major axis of the ellipse, passing through the first focal point and the second focal point, is inclined with respect to the optical axis.

10 Claims, 5 Drawing Sheets

(56) References Cited

U.S. PATENT DOCUMENTS

| | | | | |
|---|---|---|---|---|
| 2009/0097269 | A1* | 4/2009 | Stauss et al. | 362/539 |
| 2009/0103323 | A1* | 4/2009 | Ishida | 362/538 |
| 2009/0231874 | A1* | 9/2009 | Kishimoto et al. | 362/538 |

* cited by examiner

LAMP UNIT FOR VEHICULAR HEADLAMP

INCORPORATION BY REFERENCE

The disclosure of Japanese Patent Application No. 2009-185625 filed on Aug. 10, 2009 including the specification, drawings and abstract is incorporated herein by reference in its entirety.

BACKGROUND OF THE INVENTION

1. Field of the Invention

The invention relates to a lamp unit for a vehicular headlamp, such as a head lamp, a fog lamp and a position lamp, and, more particularly, to a projector-type lamp unit that uses a light-emitting element, such as a light-emitting diode, as a light source.

2. Description of the Related Art

In recent years, a lamp unit that uses a light-emitting element, such as a light-emitting diode, is increasingly employed as a vehicular headlamp.

For example, FIG. 7 illustrates a lamp unit described in Japanese Patent Application Publication No. 2007-80606. The lamp unit includes a projection lens 2, a light-emitting element 4 and a reflector 6. The projection lens 2 is arranged in an optical axis L that extends in a vehicle longitudinal direction. The light-emitting element 4 is a light source and is arranged to face downward near the optical axis L on the rear side with respect to a rear focal point F of the projection lens 2. The reflector 6 is arranged so as to cover the light-emitting element 4 from the lower side toward which the light-emitting element 4 irradiates light, and reflects the light irradiated from the light-emitting element 4 forward to the optical axis L.

Then, the reflector 6 is formed in an elliptical shape in longitudinal section and has a first focal point f1 at the center of light emission of the light-emitting element 4 and a second focal point f2 at the rear focal point F of the projection lens 2. In order to effectively utilize light reflected by (an effective reflective surface of) the reflector 6, light reflected at a front edge portion (portion including an edge adjacent to the projection lens 2) 6*a* of (the effective reflective surface of) the reflector 6 is allowed to enter the projection lens 2. That is, the front edge portion 6*a* of (the effective reflective surface of) the reflector 6 is a limit point for introducing light from the light-emitting element 4 toward the projection lens 2, and is naturally determined on the basis of the size of the projection lens 2 and the position of the rear focal point F.

However, because an axis that passes through the first and second focal points f1 and f2 of the reflector 6 (major axis of the elliptical shape of the reflector 6) is aligned along the optical axis L, when taking into consideration light reflected at the reflector front edge portion 6*a*, the ratio b/a of a distance b from a reflective position of the reflector 6 to the second focal point f2 with respect to a distance a from the center of light emission to the reflective position is relatively large. Therefore, a light source image projected onto a light distribution screen (not shown) located forward of the projection lens 2 is magnified to thereby relatively widen a light condensing area. As a result, the luminous intensity of a hot zone at the center portion of a distribution pattern formed by the lamp unit is insufficient.

Then, in the lamp unit, an additional reflective surface (downward facing reflective surface) 8 that reflects part of light reflected by the reflector 6 toward the projection lens 2 is provided between the reflector 6 and the projection lens 2. By so doing, a second light distribution Ls formed by the additional reflective surface (downward facing reflective surface) 8 is added to a first light distribution Lm formed by the reflector 6 to thereby increase the luminous intensity of the hot zone (compensate for the insufficient luminous intensity of the hot zone).

That is, in the lamp unit, as shown in FIG. 7 and FIG. 8, the light distribution Lm (first distribution pattern Pm) of light reflected by the reflector 6 is combined with the light distribution Ls (second distribution pattern Ps) of light reflected by the additional reflective surface 8 to thereby obtain a desired high beam distribution pattern of which the luminous intensity of the center hot zone is increased. Note that the portion indicated by the broken line in FIG. 8 shows a light shielding region that is cut by the front edge portion of the additional reflective surface (downward facing reflective surface) 8.

In the lamp unit, light reflected by the additional reflective surface (downward facing reflective surface) 8 provided between the reflector 6 and the projection lens 2 is utilized as the light distribution Ls (part of light reflected by the reflector 6 is controlled by the downward facing reflective surface 8) to thereby make it possible to increase the luminous intensity of the hot zone.

However, in this case, light that forms the second distribution pattern Ps (second light distribution) Ls loses energy when the light is reflected by the reflector 6 and the downward facing reflective surface 8 twice, and has a low intensity. Therefore, light irradiated from the light-emitting element 4 is not effectively utilized because of the loss of energy. That is, the effective utilization of light irradiated from the light-emitting element 4 is low.

Furthermore, because of the additional reflective surface (downward facing reflective surface) 8, the distribution pattern (see FIG. 8) having a cut-off line A is formed at the lower side. Thus, the contrast is apparent along the cut-off line A. This may possibly cause deterioration in forward visibility.

SUMMARY OF THE INVENTION

The invention provides a lamp unit for a vehicular headlamp that has a high effective utilization of light from a light source and that is able to obtain a high-beam light distribution having a high intensity hot zone and excellent visibility.

An aspect of the invention relates to a lamp unit for a vehicular headlamp. The lamp unit includes: a projection lens that is arranged so as to have an optical axis extending in a vehicle longitudinal direction; a light-emitting element that is a light source and that is arranged on a rear side with respect to a rear focal point of the projection lens; and a reflector that is formed so that a longitudinal section of the reflector has an elliptical shape that includes at least part of an ellipse having a first focal point at a center of light emission of the light-emitting element and a second focal point at the rear focal point of the projection lens, wherein the reflector is arranged so as to cover the light-emitting element and reflects irradiated light toward the projection lens, the irradiated light being light irradiated from the light-emitting element. In the lamp unit, a major axis of the ellipse, passing through the first focal point and the second focal point, is inclined with respect to the optical axis.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described.

Figure 1:
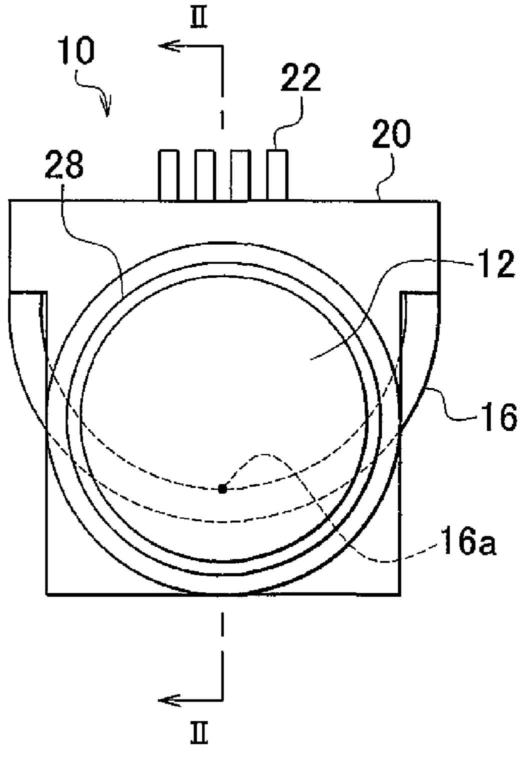
FIG. 1 is a front view of a lamp unit for a vehicular headlamp according to a first embodiment of the invention.
Figure 2:
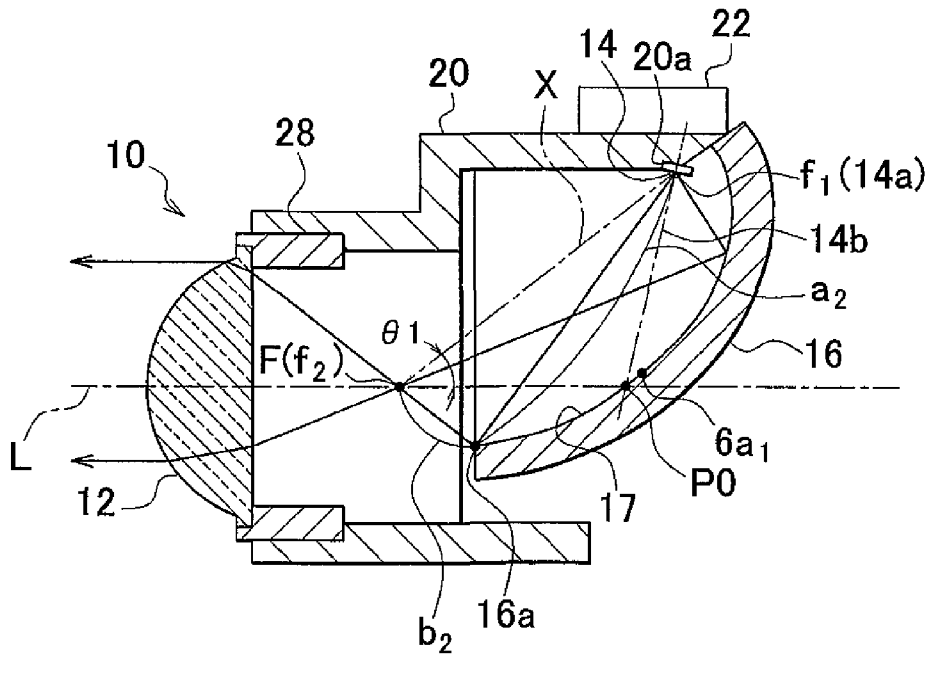
FIG. 2 is a longitudinal sectional view of the lamp unit, taken along the line II-II in FIG. 1.

As shown in FIG. 1 and FIG. 2, a lamp unit 10 for a vehicular headlamp according to a first embodiment of the invention is a high-beam lamp unit used in a state where it is assembled as part of the vehicular headlamp. The lamp unit 10 includes a projection lens 12, a light-emitting element 14 and a reflector 16. The projection lens 12 is arranged in an optical axis L that extends in a vehicle longitudinal direction. The light-emitting element 14 is arranged to face downward on the rear side with respect to a rear focal point F of the projection lens 12. The reflector 16 is arranged so as to cover the light-emitting element 14 from the lower side, and reflects light from the light-emitting element 14 forward to the optical axis L.

The projection lens 12 is formed of a planoconvex aspherical lens of which the front surface is a convex surface and the rear surface is a planar surface. The projection lens 12 projects a light source image formed on a rear focal plane (that is, a focal plane that includes the rear focal point F) onto an imaginary vertical screen located on the front side of the lamp unit as an inverted image. The projection lens 12 is fixed to a base member 20 via a ring-shaped lens holder 28.

The light-emitting element 14 is a white light-emitting diode having a square light-emitting chip 14*a* having a size of about 0.3 to 3 mm square. The light-emitting element 14 irradiates light having a strong orientation characteristic, so the intensity of light remarkably decreases as a position is deviated from the position facing the light-emitting element 14 in comparison with the intensity of light at the position facing the light-emitting element 14. In the present embodiment, the light-emitting element 14 is fixedly positioned at a light source support portion 20*a* so that the direction of light irradiated from the light-emitting element 14 is directed downward and its irradiation axis 14*b* passes through an intersection point P0 of the optical axis L and the reflector 16. The light source support portion 20*a* is formed on the lower surface of the metal base member 20.

In the present embodiment, a portion of the reflector 16 around a position that meets an extension of the optical axis L faces the light-emitting element 14. Thus, the optical characteristic of (the effective reflective surface 17 of) the reflector 16 having an elliptical shape in longitudinal section is utilized to irradiate high-intensity light along the optical axis L. This increases the luminous intensity of the hot zone at the center portion of the distribution pattern formed by the lamp unit 10.

In addition, the effective reflective surface 17 of the reflector 16 is formed of a substantially ellipsoidal curved surface (curved surface having a partial ellipsoid larger than a quarter ellipsoid) having the center of light emission of the light-emitting element 14 as a first focal point f1, and the eccentricity of the effective reflective surface 17 gradually increases from its vertical cross section to its horizontal cross section. Then, the reflective surface 17 converges light, emitted from the light-emitting element 14, to the rear focal point F of the projection lens 12 in the vertical cross section, and displaces the converging point considerably forward in the horizontal cross section. That is, the longitudinal section of the effective reflective surface 17 of the reflector 16 is formed in an elliptical shape having the first focal point f1 at the center of light emission of the light-emitting element 14 and the second focal point f2 at the rear focal point F of the projection lens 12.

Then, the reflector 16 is fixed to the base member 20 so that the major axis X of the elliptical shape, passing through the first focal point f1 and the second focal point f2, is inclined downward toward the front (upward toward the rear) by θ1 with respect to the optical axis L. That is, the major axis X is inclined so that the first focal point f1 is located on the upper side with respect to the second focal point f2.

Then, in order to effectively utilize light reflected by the reflector 16 (effective reflective surface 17), the front edge portion (portion including an end adjacent to the projection lens 12) 16*a* of the reflector 16 (effective reflective surface 17) is extended to a frontmost position of the reflector (effective reflective surface 17) in longitudinal section including the center of the projection lens 12. Light reflected by the reflector 16 (effective reflective surface 17) can enter the projection lens 12 from the frontmost position of the reflector (effective reflective surface 17) via the focal point F (f2). The frontmost position is a position at which a tangent of the elliptical shape in the longitudinal section is parallel to the optical axis of the projection lens 12. Note that the reference numeral 6*a*1 in FIG. 2 indicates the position of the reflector front edge portion in a state where the reflector 6 shown in FIG. 7 is inclined by θ1 with respect to the optical axis L.

Therefore, in comparison with a structure that the reflector 16 is not inclined with respect to the optical axis L, (the effective reflective surface 17 of) the reflector 16 is enlarged toward the front to thereby increase the amount of light distribution of the lamp unit 10 by that much.

In addition, a distance a2 from the center of light emission of the light-emitting element 14 to the front edge portion 16*a* of (the effective reflective surface 17 of) the reflector 16 is extended in comparison with the corresponding distance a in the case of the lamp unit according to the related art, and a distance b2 from the front edge portion 16*a* of (the effective reflective surface 17 of) the reflector 16 to the rear focal point F of the projection lens 12 is reduced in comparison with the corresponding distance b in the case of the lamp unit according to the related art. Thus, as will be described later, the luminous intensity of the hot zone at the center portion of the distribution pattern is higher than the luminous intensity of the hot zone of the lamp unit according to the related art.

Figure 7:
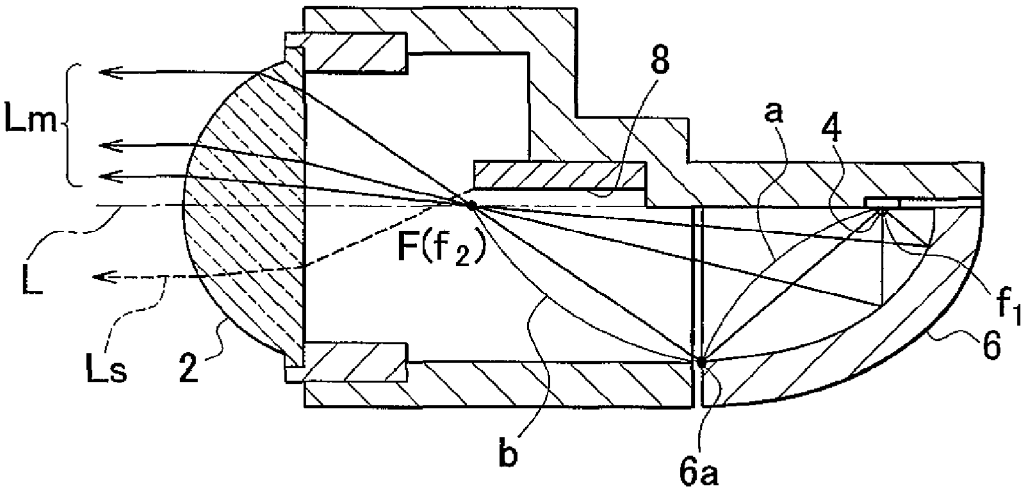
FIG. 7 RELATED ART
FIG. 7 is a longitudinal sectional view of a lamp unit for a vehicular headlamp according to the related art.

That is, FIG. 7 shows the lamp unit according to the related art, in which the major axis of the elliptical shape of the reflector 6 (axis that passes through the first and second focal points f1 and f2 of the reflector 6) is aligned along the optical axis L. For example, as indicated by the solid line in FIG. 9, when the major axis X of the elliptical shape of the reflector 6 (axis that passes through the first and second focal points f1 and f2 of the reflector 6) is inclined downward toward the front by θ with respect to the optical axis L, the position of the front edge portion 6*a* of (the effective reflective surface of) the reflector 6, which is a limit point for introducing light from the light-emitting element 4 toward the projection lens 2, may be extended to the position indicated by the reference numeral 6*a*1 (from the position indicated by the reference numeral 6*a*1 to the position indicated by the reference numeral 16*a* in the reflector 16 in FIG. 2), as shown by the broken line in FIG. 9. As a result, (the effective reflective surface of) the reflector is enlarged toward the front to thereby increase the amount of light distribution of the lamp unit by that much. Furthermore, a distance from the front edge portion 6*a*1 of (the effective reflective surface of) the reflector 6 to the rear focal point F of the projection lens 2 is reduced to thereby increase the luminous intensity of the hot zone at the center portion of the distribution pattern.

Figure 9:
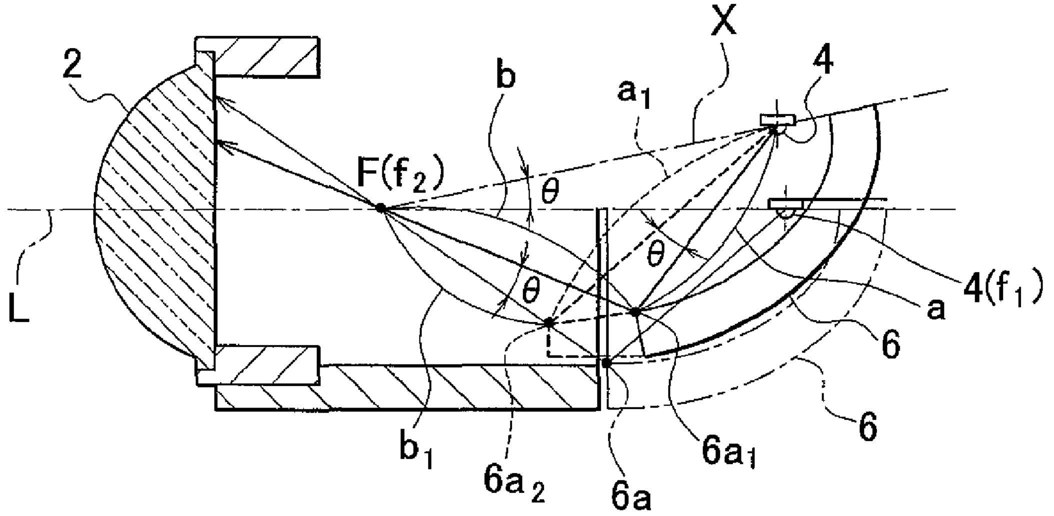
FIG. 9 is a longitudinal sectional view of the lamp unit according to the embodiments of the invention in a state where a reflector is inclined with respect to an optical axis in order to make a comparison with the lamp unit shown in FIG. 7.

Then, as shown in FIG. 9, in consideration of light reflected at the front edge portion 6*a*2 of (the effective reflective surface) of the reflector 6, because a1>a and b1<b, the ratio (b1/a1) of the distance b1 from the reflective position of the reflector front edge portion 6*a*2 to the second focal point f2 with respect to the distance a1 from the center of light emission to the reflective position of the reflector front edge portion 6*a*2 is smaller than the corresponding ratio (b/a) in the lamp unit shown in FIG. 7 (b1/a1<b/a). Thus, a light source image projected onto the light distribution screen via the projection lens 2 is not so magnified, so a light condensing area narrows to increase the luminous intensity of the hot zone at the center portion of the distribution pattern.

As in the case shown in FIG. 9, in FIG. 2 in which the reflector 16 is inclined by θ1 with respect to the optical axis L, because a2>a and b2<b, the ratio (b2/a2) of a distance b2 from the reflective position of the reflector front edge portion 16*a* to the second focal point f2 with respect to a distance b2 from the center of light emission to the reflective position is smaller than the corresponding ratio (b/a) in the lamp unit shown in FIG. 7 (b2/a2<b/a). Therefore, a light source image projected onto the light distribution screen via the projection lens 12 is not so magnified, and a light condensing area narrows, so the luminous intensity of the hot zone HZ (see FIG. 3) at the center portion of the distribution pattern PH formed by the lamp unit 10 increases.

In addition, because the luminous intensity of the hot zone HZ increases, it is not necessary to provide an additional reflective surface, such as a downward facing reflective surface.

That is, first, the light distribution of the lamp unit 10 is light that is reflected by the reflector 16 just once and that has a high intensity. This means that light irradiated from the light-emitting element 14 is effectively utilized. In other words, the effective utilization of light irradiated from the light-emitting element 14 is high.

Figure 8:
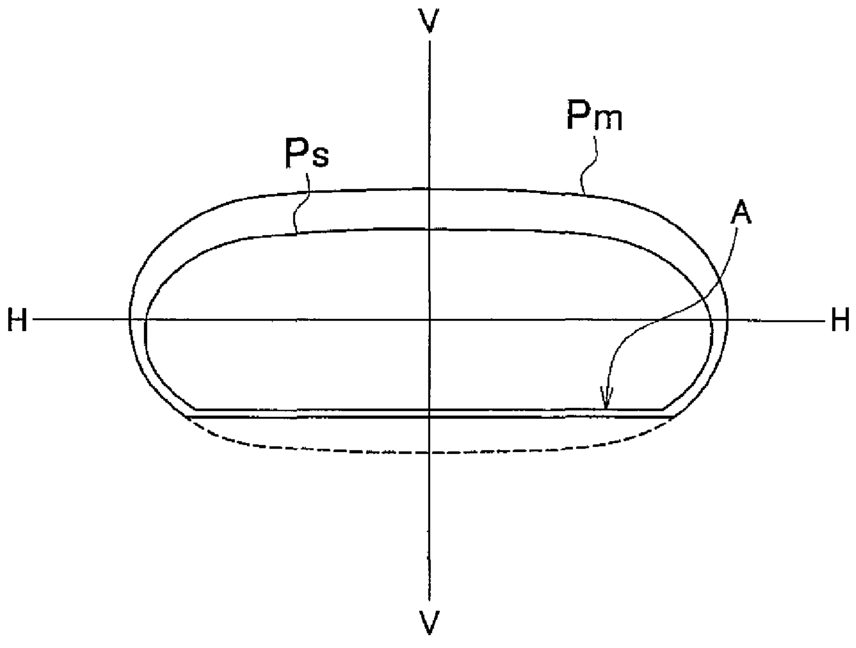
FIG. 8 RELATED ART
FIG. 8 is a view that shows a distribution pattern formed by the lamp unit.

Second, the distribution pattern PH (see FIG. 3) of the lamp unit 10 has a desirable elliptical shape as a high beam with no cut-off line. This suppresses a decrease in forward visibility unlike the distribution pattern (see FIG. 8) according to the related art.

In addition, a heat sink 22 shown in FIG. 2 is integrally provided on an upper surface of the base member 20, corresponding to a position to which the light-emitting element 14 is attached, and is formed of plate-like radiation plates that are arranged on the base member 20 at equal intervals in the lateral direction. Heat tends to be transferred to the upper side as compared with the lower side. Thus, by providing the heat sink 22 on the upper side of the base member 20, which is a transfer path of heat of the light-emitting element 14, the light-emitting element 14 may be effectively cooled.

Figure 3:
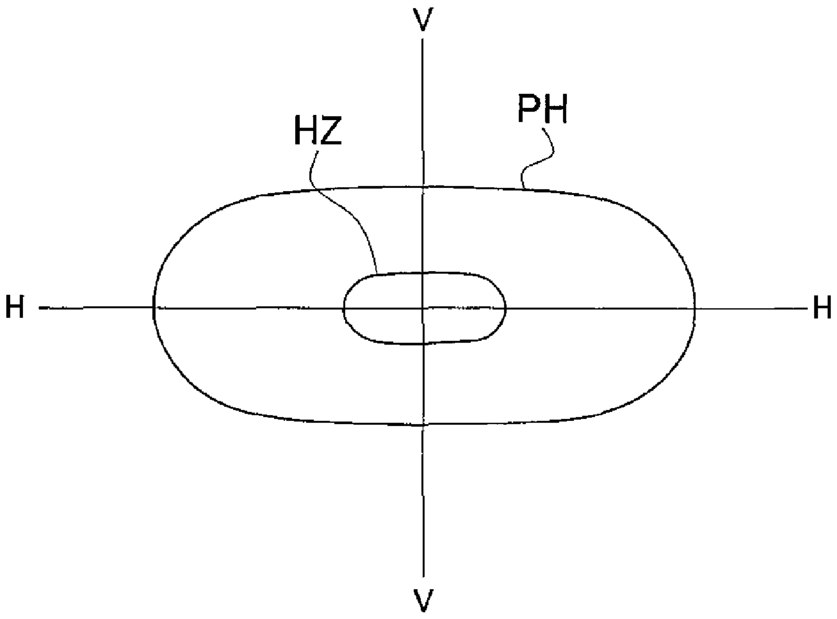
FIG. 3 is a view that shows a distribution pattern formed by the lamp unit.

FIG. 3 is a front view of the high-beam distribution pattern PH formed by light irradiated forward from the lamp unit 10 on the light distribution screen arranged at a position 25 meters forward from the vehicle.

The high-beam distribution pattern PH is formed by light reflected by the reflector 16, and has a horizontally long substantially elliptical shape that is substantially vertically symmetrical with respect to the H-H line passing horizontally through the vertically center portion of the light distribution screen. The hot zone HZ has a horizontally long substantially elliptical shape having a center at the intersection of the H-H line and the V-V line.

Figure 4:
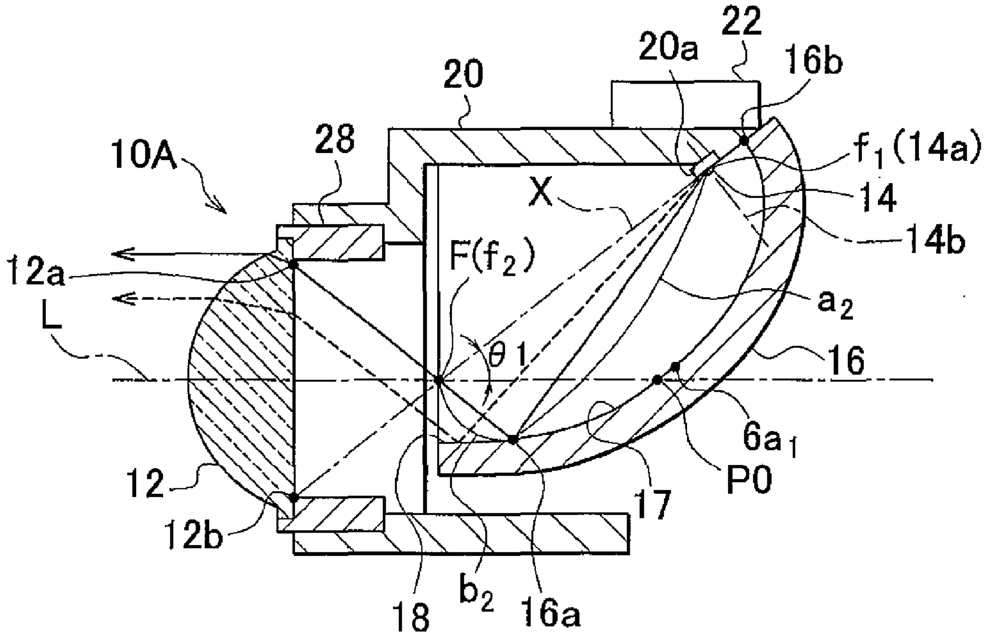
FIG. 4 is a longitudinal sectional view of a lamp unit for a vehicular headlamp according to a second embodiment of the invention.

FIG. 4 is a view that shows a second embodiment of the invention and corresponds to FIG. 2.

In a lamp unit 10A according to the second embodiment, as well as the lamp unit 10 according to the above described first embodiment, the reflector 16 is arranged so as to be inclined downward toward the front by θ1 with respect to the optical axis L, and the front edge portion 16*a* of (the effective reflective surface 17 of) the reflector 16 is extended forward. By so doing, the amount of light distribution of the lamp unit 10A increases, and the luminous intensity of the hot zone at the center portion of the distribution pattern is increased. In addition, the light-emitting element 14 is arranged so that its irradiation axis 14*b* is perpendicular to the major axis X of the reflector 16, and light irradiated from the light-emitting element 14 toward a wide range of region is reflected by (the effective reflective surface 17 of) the reflector 16 and is utilized as the light distribution of the lamp unit 10A.

Therefore, in the lamp unit 10A according to the present embodiment, the utilization efficiency of light irradiated from the light-emitting element 14 as a light distribution is high, and the amount of light distribution is larger than that of the lamp unit 10 according to the first embodiment.

In addition, in the present embodiment, as shown in FIG. 4, the projection lens 12 and the reflector 16 are arranged so that, in a longitudinal section including the center of the projection lens 12, light reflected by (the effective reflective surface 17 of) the reflector 16 enters the entire region of the projection lens 12. Specifically, the projection lens 12 and the reflector 16 are arranged so that, in a longitudinal section including the center of the projection lens 12, light that is reflected at an uppermost portion 16*b* of (the effective reflective surface 17 of) the reflector 16 and passes through the focal point F (f2) enters a lowermost portion 12*b* of an effective incident region of the projection lens 12 and light that is reflected at a frontmost portion (lowermost portion) 16*a* of (the effective reflective surface 17 of) the reflector 16 and passes through the focal point F (f2) enters an uppermost portion 12*a* of the effective incident region of the projection lens 12.

Therefore, in the present embodiment, light reflected from (the effective reflective surface 17 of) the reflector 16 is most effectively utilized in forming the light distribution of the lamp unit 10A, so the amount of light distribution of the lamp unit 10A increases.

Note that, in the longitudinal section including the center of the projection lens 12, (the effective reflective surface 17 of) the reflector 16 falls within the range between two straight lines that respectively pass from the uppermost portion 12*a* and lowermost portion 12*b* of the projection lens 12 through the rear focal point F of the projection lens 12, and this configuration is the same as that of the above described first embodiment.

In addition, a substantially flat additional reflective surface 18 is integrally provided on the front side of the front edge portion 16*a* of (the effective reflective surface 17 of) the reflector 16 and reflects light irradiated from the light-emitting element 14 toward the projection lens 12. By so doing, light reflected by the additional reflective surface 18 is also utilized as the light distribution of the lamp unit 10A.

Specifically, as indicated by the broken line in FIG. 4, light emitted from the light-emitting element 14 is reflected by the additional reflective surface 18 and passes obliquely upward through the rear focal plane of the projection lens 12 at a position, deviated downward from the optical axis L, toward the upper side with respect to the optical axis L of the projection lens 12, and then passes through the projection lens 12. The light distribution formed by the additional reflective surface 18 is formed of light that widely diffuses upward toward the right and left with respect to a horizontal position, so the light distribution functions to enhance the visibility of a distant illumination area.

The other configuration is similar to that of the above described first embodiment, so like reference numerals denote substantially identical components and the description thereof is omitted.

Figure 5:
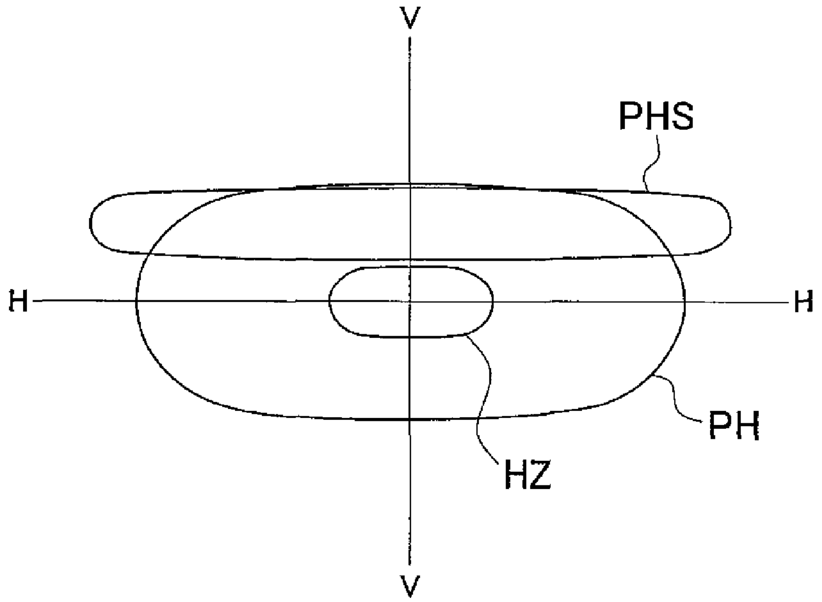
FIG. 5 is a view that shows a distribution pattern formed by the lamp unit.

FIG. 5 shows the distribution pattern formed by the lamp unit 10A. The distribution pattern PHS formed by the additional reflective surface 18 has a substantially elliptical shape that is laterally slender over the distribution pattern PH on the upper side of the hot zone HZ.

Figure 6:
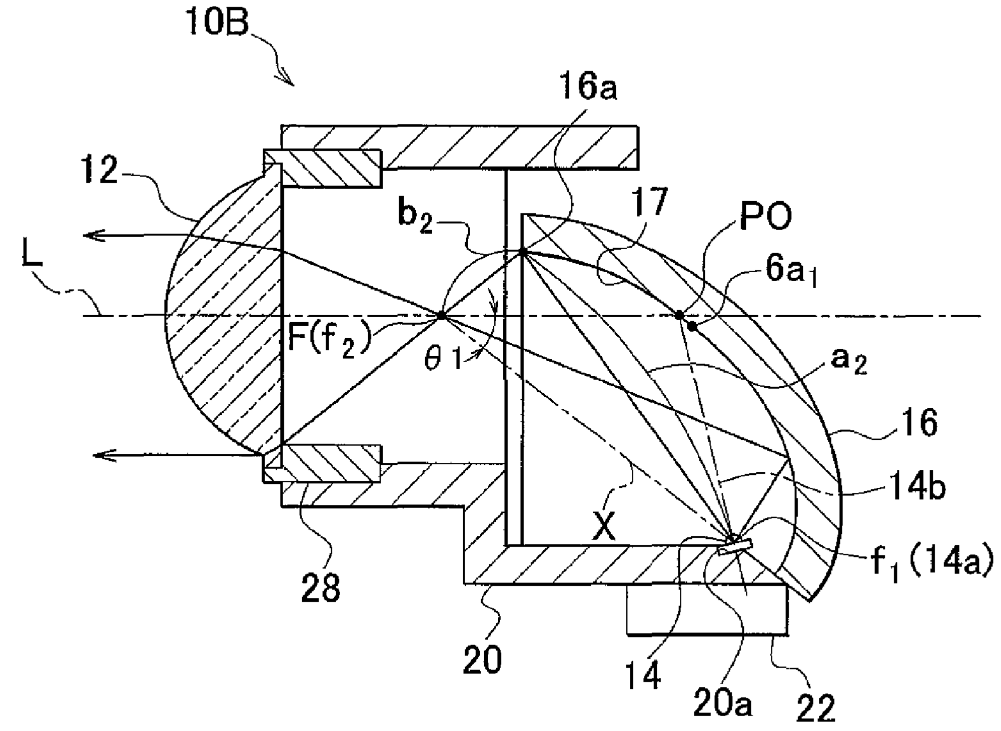
FIG. 6 is a longitudinal sectional view of a lamp unit for a vehicular headlamp according to a third embodiment of the invention.

FIG. 6 is a view that shows a third embodiment of the invention and corresponds to FIG. 2 and FIG. 4.

In the lamp units 10 and 10A according to the above described two embodiments, both light-emitting elements 14 face downward, and both reflectors 16 face upward; however, in a lamp unit 10B according to the third embodiment, the light-emitting element 14 faces upward, and the reflector 16 faces downward. Thus, the lamp unit 10 shown in FIG. 2 is inverted upside down.

The other configuration is similar to those of the above described first and second embodiments, so the overlap description is omitted.

The shape of the distribution pattern formed by the lamp unit 10B is substantially the same as the distribution pattern (see FIG. 3) formed by the lamp unit 10 according to the first embodiment.

Note that, in the lamp unit 10B as well, an additional reflective surface (see the reference numeral 18 in FIG. 4) facing downward may be provided at the reflector front edge portion 16*a* to increase the amount of light distribution of the lamp unit 10B. However, light reflected by the additional reflective surface travels through the front side of the rear focal plane (located on the upper side with respect to the optical axis L) of the projection lens 12, passes through (a region below around the optical axis L of) the projection lens 12 and then forms a distribution pattern that illuminates the lower side of the light distribution screen with respect to the line. Then, as the luminous intensity of the entire illumination area of the light distribution screen below the H-H line increases, there is a possibility that the forward visibility deteriorates because of road surface reflection in the rain.

Thus, in the lamp unit 10B according to the third embodiment, an additional reflective surface need not be provided at the reflector front edge portion 16*a*.

In addition, in any of the lamp units 10, 10A and 10B according to the above described embodiments, one projection lens 12 is integrally provided in correspondence with the reflector 16 for which one light-emitting element 14 is attached; however, it is also applicable that a plurality of reflectors 16 for each of which the light-emitting element 14 is attached are integrally provided in correspondence one projection lens.

Then, in a lamp unit that is configured to form a plurality of distribution patterns using one projection lens common to the plurality of reflectors for each of which the light-emitting element is attached, it is also applicable that not each light-emitting element is attached to a base member corresponding to the reflector but each light-emitting element is arranged on the same plane of a single base member. By so doing, radiation property for radiating heat of each light-emitting element outside and assembling workability for attaching each light-emitting element to the base member are favorable.

The outline of the embodiment of the invention will be described below.

An embodiment of the invention relates to a lamp unit for a vehicular headlamp. The lamp unit includes: a projection lens that is arranged so as to have an optical axis extending in a vehicle longitudinal direction; a light-emitting element that is a light source and that is arranged on a rear side with respect to a rear focal point of the projection lens; and a reflector that is formed so that a longitudinal section of the reflector has an elliptical shape that includes at least part of an ellipse having a first focal point at a center of light emission of the light-emitting element and a second focal point at the rear focal point of the projection lens, wherein the reflector is arranged so as to cover the light-emitting element and reflects irradiated light toward the projection lens, the irradiated light being light irradiated from the light-emitting element. In the lamp unit, a major axis of the ellipse, passing through the first focal point and the second focal point, is inclined with respect to the optical axis.

With the above configuration, the light distribution of the lamp unit is formed of light that is reflected by the reflector just once and that has a high intensity. This means that light irradiated from the light-emitting element is effectively utilized. In other words, the effective utilization of light irradiated from the light-emitting element is high. In addition, the distribution pattern of the lamp unit has a desirable elliptical shape as a high beam with no cut-off line. This suppresses a decrease in forward visibility.

In the lamp unit according to the embodiment of the invention, the longitudinal section of the reflector may include a center of the projection lens, and the reflector may be arranged so that, in the longitudinal section, the irradiated light reflected by the reflector enters an entire region of the projection lens. With the above configuration, in the longitudinal section including the center of the projection lens, (the effective reflective surface of) the reflector falls within the range between two straight lines that respectively pass from the uppermost portion and lowermost portion of the projection lens through the rear focal point of the projection lens, so the entire light reflected by (the effective reflective surface of) the reflector enters the projection lens. That is, light reflected by the reflector is most effectively utilized in forming the light distribution of the lamp unit, so the amount of light distribution of the lamp unit increases. Thus, a lamp unit for a vehicular headlamp that has a further high effective utilization of light from a light source and that is able to obtain a high-beam light distribution having a further high intensity hot zone and an excellent visibility is provided.

The lamp unit according to the embodiment of the invention may further include an additional reflective surface that is connected to an end of the reflector adjacent to the projection lens and that reflects the irradiated light toward the projection lens. With the above configuration, the projection lens and (the front edge portion of the effective reflective surface of)

the reflector are arranged so that light reflected from (the effective reflective surface of) the reflector passes through the rear focal point of the projection lens and enters the projection lens; however, light that is directed from the center of light emission toward a region beyond the reflector front edge portion cannot be utilized as a light distribution. Then, by providing an additional reflective surface having a shape different from that of the effective reflective surface and reflecting light emitted from the light-emitting element toward the projection lens at a region beyond a limit position (reflector front edge portion) of the effective reflective surface, it is also possible to utilize light reflected by the additional reflective surface as the light distribution of the lamp unit. Thus, the amount of light distribution formed by the lamp unit is increased by an amount equivalent to the amount of light distribution formed by the additional reflective surface, so the forward visibility is improved by that much.

In the lamp unit according to the embodiment of the invention, the major axis of the ellipse may be inclined so that the first focal point is located on an upper side with respect to the second focal point.

In the lamp unit according to the embodiment of the invention, the light-emitting element may be arranged to face downward, and the reflector may be arranged to face obliquely upward so that the major axis of the ellipse of the reflector is inclined from a position of the rear focal point of the projection lens upward toward a rear side. With the above configuration, light reflected by the additional reflective surface travels through the front side of the rear focal plane of the projection lens toward (a region on the upper side with respect to the optical axis of) the projection lens, and then forms a light distribution that illuminates the upper side of a light distribution screen. Then, as the luminous intensity of the entire illumination area on the upper side in the distribution pattern formed by the lamp unit increases, the distant visibility is enhanced. Thus, by providing the additional reflective surface at the front edge portion of the reflector, the luminous intensity of a distant illumination area increases without changing the luminous intensity of a road surface illumination area. In addition, the light distribution formed by the additional reflective surface is formed of light that is emitted from the light-emitting element and that is reflected by the additional reflective surface just once, so light irradiated from the light-emitting element may be effectively utilized. In addition, a heat sink is provided on a base member to which the light-emitting element is attached to make it possible to efficiently enhance the radiation effect of the light-emitting element.

In the lamp unit according to the embodiment of the invention, the light-emitting element may be arranged so that an axis of the irradiated light passes through an intersection of the optical axis and the reflector. With the above configuration, a portion of the reflector around a position that meets an extension of the optical axis faces the light-emitting element that emits light having a strong orientation characteristic, so the high-intensity light is irradiated along the optical axis to thereby increase the luminous intensity of a hot zone at the center portion of the distribution pattern of the lamp unit. Thus, it is particularly effective in forming a high-beam light distribution that does not diffuse by a large amount on its front side and that reaches a distant location with good visibility.

In the lamp unit according to the embodiment of the invention, the end of the reflector adjacent to the projection lens may extend so that at least part of the ellipse is larger than a quarter of the ellipse.

In the lamp unit according to the embodiment of the invention, a tangent of the ellipse at the end of the reflector adjacent to the projection lens may be parallel to the optical axis of the projection lens.

Note that, in the embodiment of the invention, it is only necessary that the light-emitting element is a light source like an element that has a light-emitting chip that emits dot-like light, and the type of the light-emitting element is not specifically limited. For example, a light-emitting diode or a laser diode may be employed as the light-emitting element.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A lamp unit for a vehicular headlamp, comprising:

a projection lens that is arranged so as to have an optical axis extending in a vehicle longitudinal direction;

a light-emitting element that is a light source and that is arranged on a rear side with respect to a rear focal point of the projection lens;

a reflector that is formed so that a longitudinal section of the reflector has an elliptical shape that includes at least part of an ellipse having a first focal point at a center of light emission of the light-emitting element and a second focal point at the rear focal point of the projection lens, wherein the reflector is arranged so as to cover the light-emitting element and reflects irradiated light toward the projection lens, the irradiated light being light irradiated from the light-emitting element, and wherein a major axis of the ellipse, passing through the first focal point and the second focal point is inclined with respect to the optical axis;

the major axis of the ellipse is inclined so that the first focal point is located on an upper side with respect to the second focal point, and a direction of light irradiated from the light emitting element is directed downward;

the major axis of the ellipse is inclined downward toward a front of the lamp unit;

wherein the light-emitting element is arranged so that an axis of light irradiated perpendicularly to the top surface of the light emitting element passes through an intersection of the optical axis and the reflector, the top surface of the light-emitting element facing forward and downward.

2. The lamp unit according to claim 1, wherein the longitudinal section of the reflector includes a center of the projection lens, and the reflector is arranged so that, in the longitudinal section, the irradiated light reflected by the reflector enters an entire region of the projection lens.

3. The lamp unit according to claim 1, wherein the reflector is arranged to face obliquely upward so that the major axis of the ellipse of the reflector is inclined from a position of the rear focal point of the projection lens upward toward a rear side.

4. The lamp according to claim 1, wherein the end of the reflector adjacent to the projection lens extends so that at least part of the ellipse is larger than a quarter of ellipse.

5. The lamp unit according to claim 1, wherein a tangent of the ellipse at the end of the reflector adjacent to the projection lens is parallel to the optical axis of the projection lens.

6. The lamp unit according to claim 1, further comprising an additional reflective surface that is connected to an end of the reflector adjacent to the projection lens and that reflects the irradiated light toward the projection lens.

7. The lamp unit according to claim 1, wherein the light emitting element is provided at a location that is higher than the projection lens.

8. A lamp unit for a vehicular headlamp, comprising:

a projection lens that is arranged so as to have an optical axis extending in a vehicle longitudinal direction;

a light-emitting element that is a light source and that is arranged on a rear side with respect to a rear focal point of the projection lens; and a reflector that is formed so that a longitudinal section of the reflector has an elliptical shape that includes at least part of an ellipse having a first focal point at a center of light emission of the light-emitting element and a second focal point at the rear focal point of the projection lens, wherein the reflector is arranged so as to cover the light-emitting element and reflects irradiated light toward the projection lens, the irradiated light being light irradiated from the light-emitting element, and wherein a major axis of the ellipse, passing through the first focal point and the second focal point is inclined with respect to the optical axis the major axis of the ellipse is inclined so that the first focal point is located on a lower side with respect to the second focal point, and a direction of light irradiated from the light-emitting element is directed upward;

the major axis of the ellipse is inclined upward toward a front of the lamp unit;

wherein the light-emitting element is arranged so that an axis of light irradiated perpendicularly to the bottom surface of the light emitting element passes through an intersection of the optical axis and the reflector, the bottom surface of the light-emitting element facing forward and upward.

9. The lamp unit according to claim 8, further comprising an additional reflective surface that is connected to an end of the reflector adjacent to the projection lens and that reflects the irradiated light toward the projection lens.

10. The lamp unit according to claim 8, wherein the light emitting element is provided at a location that is lower than the projection lens.

* * * * *